United States Patent
Jung et al.

(10) Patent No.: US 10,650,971 B2
(45) Date of Patent: May 12, 2020

(54) CAPACITOR COMPONENT AND METHOD OF MANUFACTURING THE SAME

(71) Applicant: SAMSUNG ELECTRO-MECHANICS CO., LTD., Suwon-Si, Gyeonggi-Do (KR)

(72) Inventors: Jin Man Jung, Suwon-Si (KR); Jin Kyung Joo, Suwon-Si (KR); Ik Hwan Chang, Suwon-Si (KR); Byeong Chan Kwon, Suwon-Si (KR); Ji Hyun Park, Suwon-Si (KR); Do Heung Na, Suwon-Si (KR); Jae Yeol Choi, Suwon-Si (KR); Sung Hyun Cho, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/959,905

(22) Filed: Apr. 23, 2018

(65) Prior Publication Data

US 2019/0066923 A1 Feb. 28, 2019

(30) Foreign Application Priority Data

Aug. 23, 2017 (KR) .................. 10-2017-0106746

(51) Int. Cl.
*H01G 4/12* (2006.01)
*H01G 4/232* (2006.01)
(Continued)

(52) U.S. Cl.
CPC ............ *H01G 4/232* (2013.01); *H01G 4/008* (2013.01); *H01G 4/012* (2013.01); *H01G 4/12* (2013.01);
(Continued)

(58) Field of Classification Search
CPC ............ H01G 4/005; H01G 4/06; H01G 4/08; H01G 4/012; H01G 4/12; H01G 4/30; H01G 4/232; H01G 4/228; H01G 4/248
See application file for complete search history.

(56) References Cited

U.S. PATENT DOCUMENTS 8,988,851 B1* 3/2015 Sawada .................. H01G 4/232
361/301.4
9,466,427 B2* 10/2016 Park ........................ H01G 2/06
(Continued)

FOREIGN PATENT DOCUMENTS

JP S61-191085 A 8/1986
JP H10-135073 A 5/1998
(Continued)

OTHER PUBLICATIONS

Office Action issued in corresponding Korean Patent Application No. 10-2017-0106746, dated Sep. 12, 2018.
(Continued)

*Primary Examiner* — Nguyen T Ha
(74) *Attorney, Agent, or Firm* — Morgan, Lewis & Bockius LLP

(57) ABSTRACT

A capacitor component includes a body including first and second internal electrodes alternately disposed with respective dielectric layers interposed therebetween to be exposed to the third and fourth surfaces of the body, respectively; first and second conductive layers covering the third and fourth surfaces and connected to the first and second internal electrodes, respectively; first and second insulating layers covering the first and second conductive layers, respectively; first and second band portions spaced apart from each other on the second surface of the body; first and second external electrodes covering a portion of the first and second band portions and the first insulating layer, respectively; and third and fourth external electrodes covering a portion of the first and second insulating layers and a portion of the first surface of the body, respectively; and a method of manufacturing the same.

16 Claims, 7 Drawing Sheets

(51) Int. Cl.
*H01G 4/30* (2006.01)
*H01G 4/008* (2006.01)
*H01G 4/012* (2006.01)

(52) U.S. Cl.
CPC .............. *H01G 4/30* (2013.01); *H01G 4/308* (2013.01); *H01G 4/1218* (2013.01); *H01G 4/1245* (2013.01)

(56) References Cited

U.S. PATENT DOCUMENTS

| | | | |
|---|---|---|---|
| 10,319,520 B2* | 6/2019 | Oh ............................ | H01G 4/30 |
| 2010/0039749 A1* | 2/2010 | Ritter ...................... | H01G 4/005 |
| | | | 361/301.4 |
| 2013/0050893 A1* | 2/2013 | Kim ....................... | H01G 4/228 |
| | | | 361/306.3 |
| 2013/0219711 A1* | 8/2013 | Fujii ........................ | H05K 3/32 |
| | | | 29/832 |
| 2015/0021076 A1* | 1/2015 | Lee .......................... | H01G 4/30 |
| | | | 174/260 |
| 2015/0022946 A1* | 1/2015 | Park ........................ | H01G 4/30 |
| | | | 361/301.4 |
| 2015/0043125 A1 | 2/2015 | Park et al. | |
| 2015/0114700 A1 | 4/2015 | Park et al. | |
| 2015/0131195 A1* | 5/2015 | Park ........................ | H01G 2/14 |
| | | | 361/275.3 |
| 2015/0325377 A1* | 11/2015 | Takeuchi ................ | H01G 4/30 |
| | | | 361/301.4 |
| 2015/0340154 A1* | 11/2015 | Kim ........................ | H01G 2/14 |
| | | | 174/260 |
| 2016/0071647 A1 | 3/2016 | Nishisaka et al. | |
| 2016/0163455 A1* | 6/2016 | Iwama ................... | H01G 4/012 |
| | | | 361/301.4 |

FOREIGN PATENT DOCUMENTS

| | | |
|---|---|---|
| JP | 2014-187289 A | 10/2014 |
| KR | 10-1228752 B1 | 1/2013 |
| KR | 10-2015-0018650 A | 2/2015 |
| KR | 10-1514558 B1 | 4/2015 |
| KR | 10-2016-0030372 A | 3/2016 |

OTHER PUBLICATIONS

Office Action issued in corresponding Korean Patent Application No. 10-2019-0065260 dated Feb. 24, 2020, with English translation.

* cited by examiner

CAPACITOR COMPONENT AND METHOD OF MANUFACTURING THE SAME

CROSS-REFERENCE TO RELATED APPLICATION(S)

This application claims the benefit of priority to Korean Patent Application No. 10-2017-0106746 filed on Aug. 23, 2017, in the Korean Intellectual Property Office, the disclosure of which is incorporated herein by reference in its entirety.

TECHNICAL FIELD

The present disclosure relates to a capacitor component and a method of manufacturing the same.

BACKGROUND

A multilayer ceramic capacitor, a capacitor component, is a chip type condenser mounted on the printed circuit boards of several types of electronic products such as display devices, including liquid crystal displays (LCDs), plasma display panels (PDPs), and the like, as well as computers, smartphones, and mobile phones, and the like, serving to charge and discharge electricity.

The multilayer ceramic capacitor (MLCC) is capable of being used as a component of various electronic devices due to advantages thereof such as a small size, high capacitance, and ease of mounting. In recent years, multilayer ceramic capacitors used in mobile devices, automobiles, and the like, are required to have a high level of mechanical strength, and for example, multilayer ceramic capacitors are required to be capable of withstanding environment factors such as external repeated shocks, vibrations, extreme temperatures and humidity, and the like.

Further, the multilayer ceramic capacitor may use a transfer method at the time of forming external electrodes. However, it is difficult to connect a band of the external electrode to a connection portion formed by the transfer, such that for connection of the thinly formed connection portion and the band, dipping may be further performed or an additional operation for aligning a capacitor to connect the band portion may be required.

SUMMARY

An aspect of the present disclosure may provide a capacitor component capable of enhancing hermetic sealing, reducing acoustic noise, and increasing component mounting density at the time of mounting the capacitor component to a set by forming an external electrode so as to easily form a connection between a connection portion and a band of the external electrode formed on a surface on which an internal electrode of a body is exposed, and a method of manufacturing the same.

According to an aspect of the present disclosure, a capacitor component may include: a body including first and second surfaces opposing each other and third and fourth surfaces connected to the first and second surfaces and opposing each other, and including a structure in which a plurality of dielectric layers are stacked and first and second internal electrodes alternately disposed with respective dielectric layers interposed therebetween to be exposed to the third and fourth surfaces, respectively; first and second conductive layers covering the third and fourth surfaces and connected to the first and second internal electrodes, respectively; first and second insulating layers covering the first and second conductive layers, respectively; first and second band portions spaced apart from each other on the second surface; a first external electrode covering a portion of the first band portion and the first insulating layer; a second external electrode covering a portion of the second band portion and the second insulating layer; a third external electrode covering a portion of the first insulating layer and a portion of the first surface; and a fourth external electrode covering a portion of the second insulating layer and a portion of the first surface.

The first and second external electrodes may be plating layers.

The plating layer may include a copper layer, a nickel layer formed on the copper layer, and a tin layer formed on the nickel layer.

The first and second band portions may be disposed to be connected to the first and second conductive layers, respectively.

The capacitor component may further include: third and fourth band portions spaced apart from each other on the first surface, the third external electrode may cover the third band portion, and the fourth external electrode may cover the fourth band portion.

The third and fourth band portions may be disposed to be connected to the first and second conductive layers, respectively.

The first to fourth external electrodes may be plating layers.

According to another aspect of the present disclosure, a method of manufacturing a capacitor component may include: forming a body by alternately stacking a plurality of dielectric layers and first and second internal electrodes; forming first and second band portions on an upper surface of the body to be spaced apart from each other; forming first and second conductive layers and first and second insulating layers covering the first and second conductive layers, respectively, on a surface of the body to which the first and second internal electrodes are exposed, respectively, and forming a first external electrode covering a portion of the first band portion and the first insulating layer, forming a second external electrode covering a portion of the second band portion and the second insulating layer, forming a third external electrode covering a portion of the first insulating layer and a portion of a lower surface of the body, and forming a fourth external electrode to cover a portion of the second insulating layer and a portion of the lower surface of the body and to be spaced apart from the third external electrode.

In the forming of the first and second band portions, the first and second band portions may be formed on the body by one method among stacking, printing, and deposition.

The first and second conductive layers may be formed by a green transfer method.

In the forming of the first and second conductive layers and the first and second insulating layers, a laminate of the first and second conductive layers and the first and second insulating layers may be transferred to the body in a single operation.

The first and second external electrodes may be formed by plating using the first and second band portions as seeds.

The method may further include: forming third and fourth band portions to be spaced apart from each other on a surface of the body opposing a surface on which the first and second band portions are formed, before the forming of the external electrodes.

The third external electrode may be formed to cover the third band portion, and the fourth external electrode may be formed to cover the fourth band portion.

The third and fourth external electrodes may be formed by plating using the third and fourth band portions as seeds.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
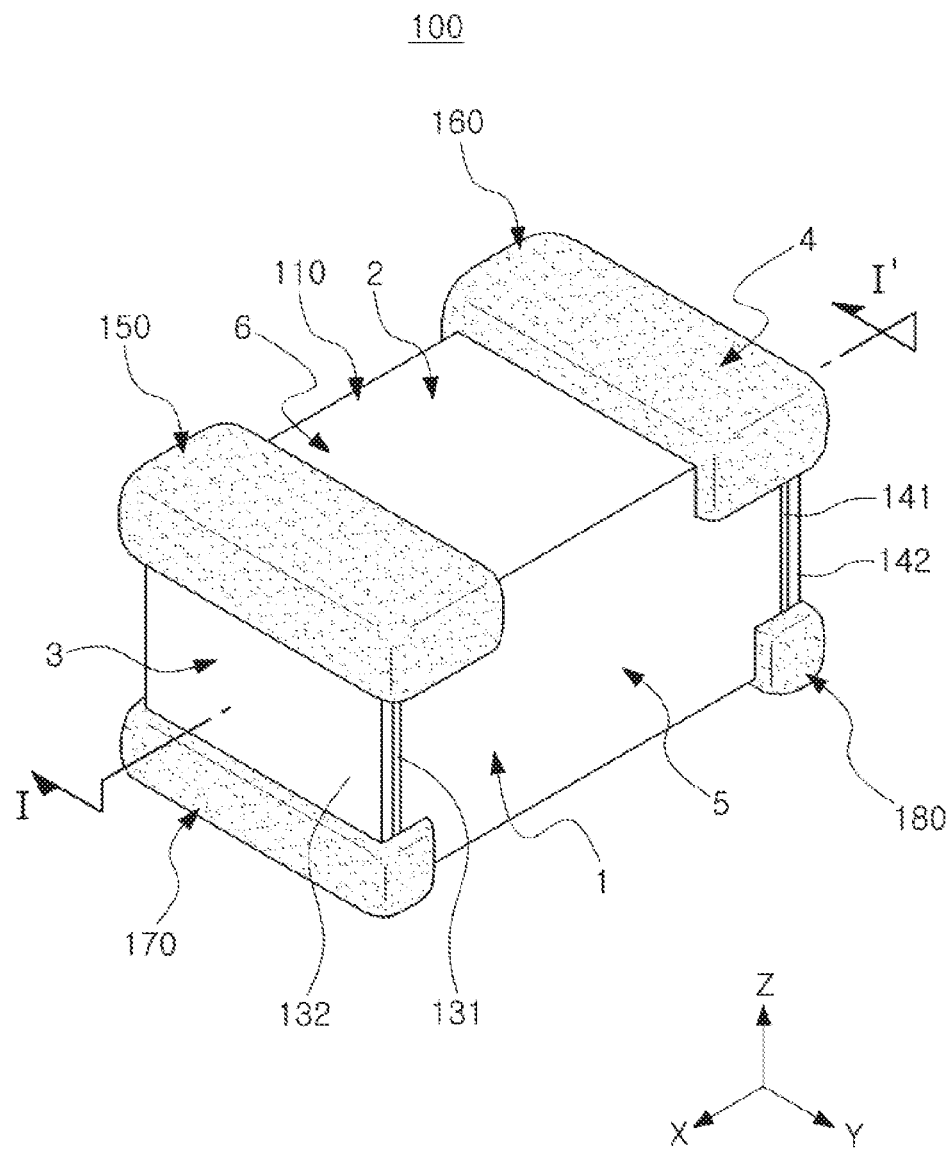
FIG. 1 is a schematic perspective view illustrating a capacitor component according to an exemplary embodiment in the present disclosure.

Hereinafter, exemplary embodiments of the present disclosure will now be described in detail with reference to the accompanying drawings. In the accompanying drawings, shapes, sizes, and the like, of components may be exaggerated or stylized for clarity.

The present disclosure may, however, be exemplified in many different forms and should not be construed as being limited to the specific embodiments set forth herein. Rather these embodiments are provided so that this disclosure will be thorough and complete, and will fully convey the scope of the disclosure to those skilled in the art.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

The meaning of a "connection" of a component to another component in the description includes an indirect connection through a third component as well as a direct connection between two components. In addition, "electrically connected" means the concept including a physical connection and a physical disconnection. It can be understood that when an element is referred to with "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

Herein, an upper portion, a lower portion, an upper side, a lower side, an upper surface, a lower surface, and the like, are decided in the accompanying drawings. For example, a first connection member is disposed on a level above a redistribution layer. However, the claims are not limited thereto. In addition, a vertical direction refers to the above-mentioned upward and downward directions, and a horizontal direction refers to a direction perpendicular to the above-mentioned upward and downward directions. In this case, a vertical cross section refers to a case taken along a plane in the vertical direction, and an example thereof may be a cross-sectional view illustrated in the drawings. In addition, a horizontal cross section refers to a case taken along a plane in the horizontal direction, and an example thereof may be a plan view illustrated in the drawings.

Terms used herein are used only in order to describe an exemplary embodiment rather than limiting the present disclosure. In this case, singular forms include plural forms unless interpreted otherwise in context.

Figure 2:
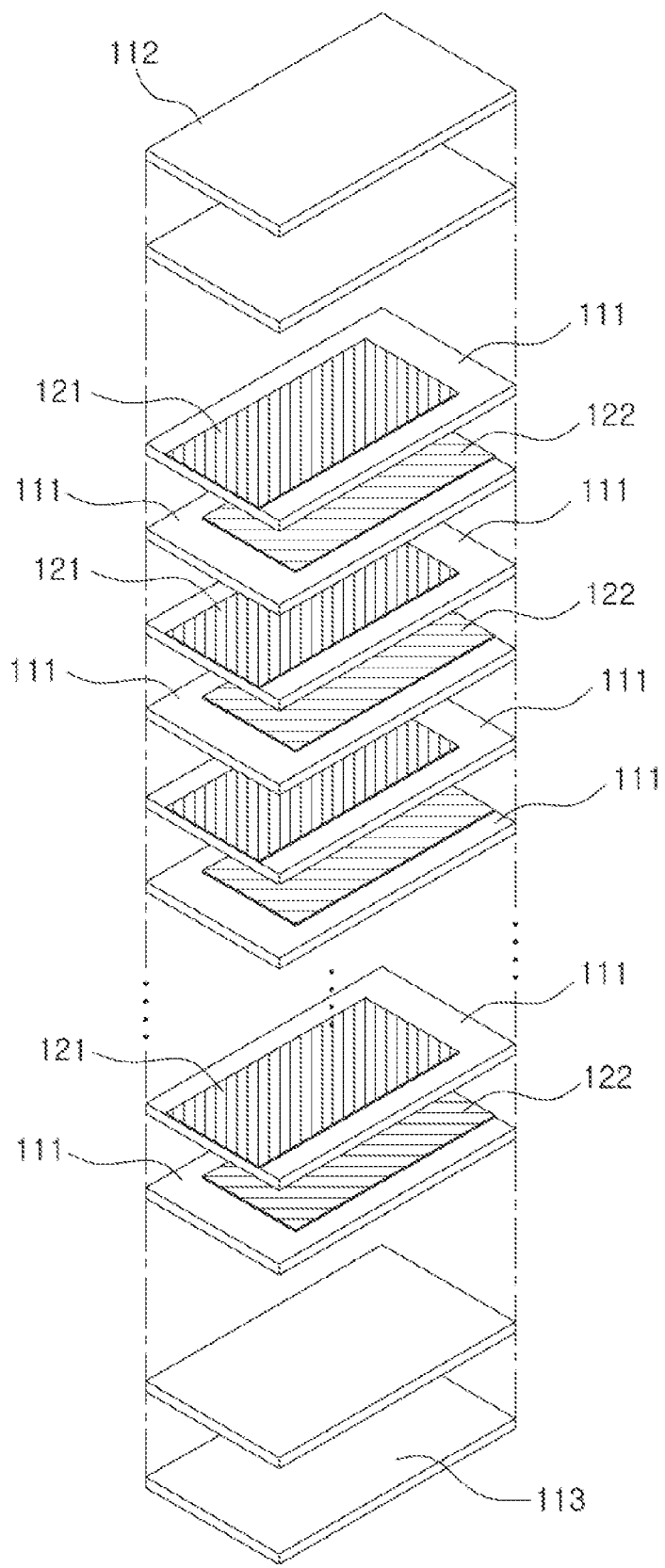
FIG. 2 is an exploded perspective view illustrating a structure of an internal electrode of a capacitor body of FIG. 1.
Figure 3:
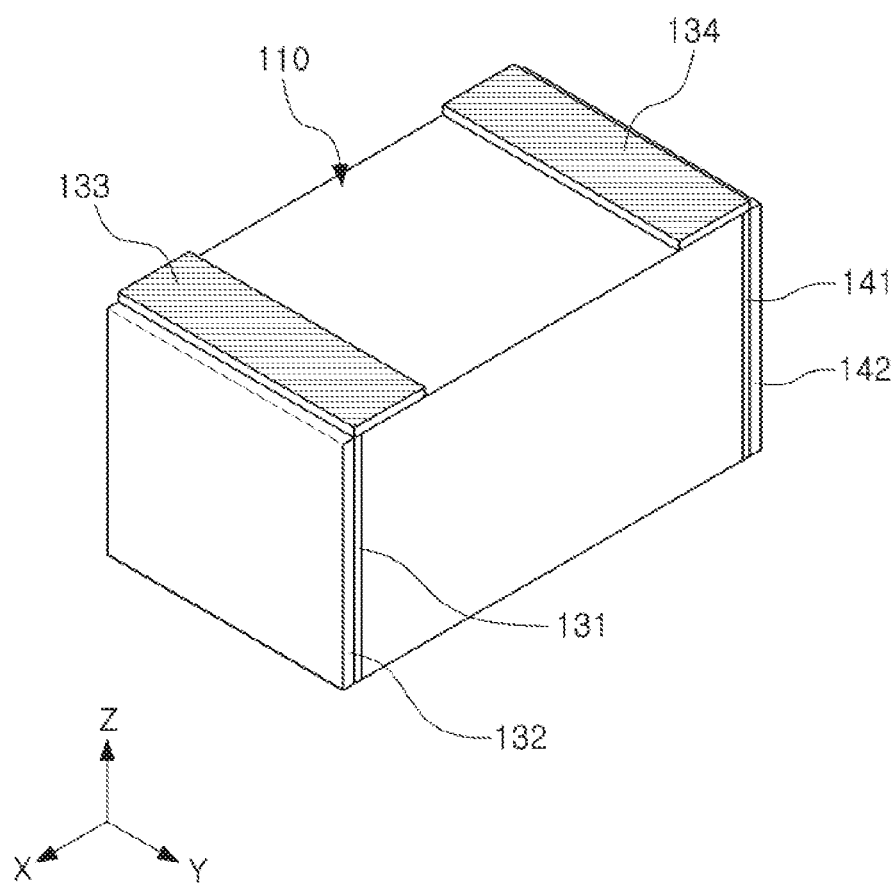
FIG. 3 is a perspective view illustrating a portion of the capacitor body and an external electrode of FIG. 1.
Figure 4:
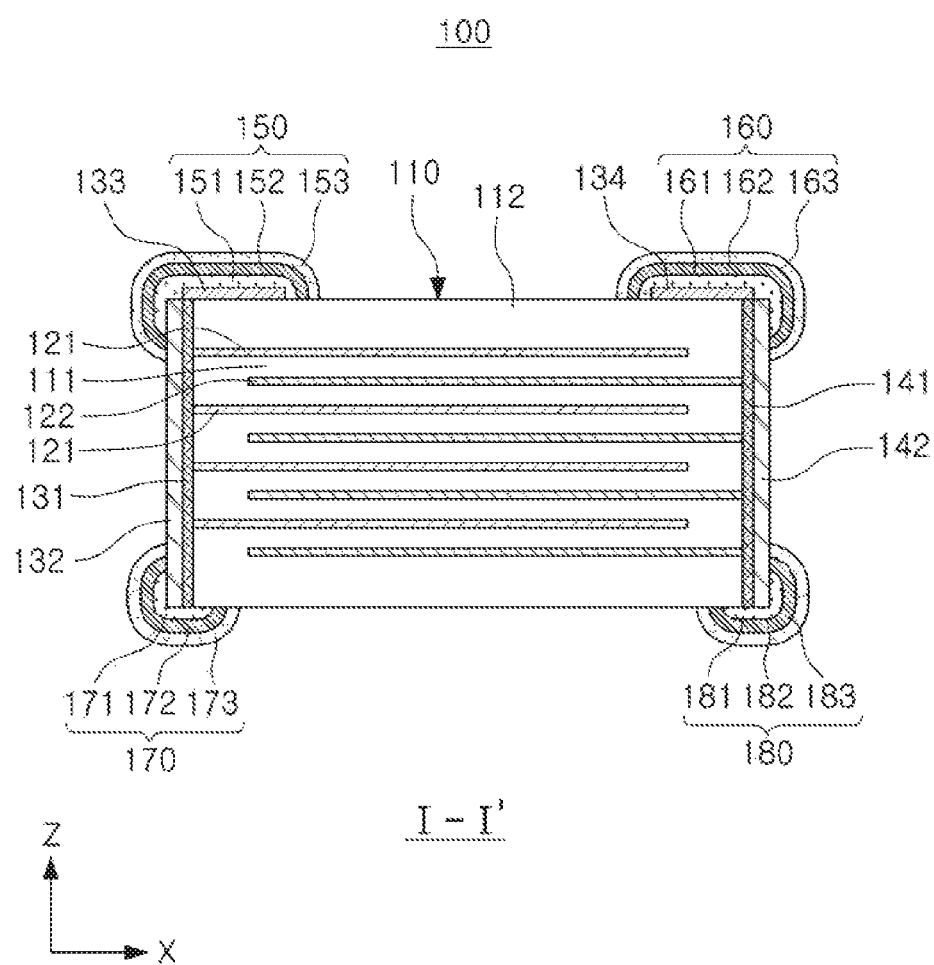
FIG. 4 is a cross-sectional view taken along line I-I' of FIG. 1.

FIG. 1 is a schematic perspective view illustrating a capacitor component according to an exemplary embodiment in the present disclosure, FIG. 2 is an exploded perspective view illustrating a structure of an internal electrode of a capacitor body of FIG. 1; FIG. 3 is a perspective view illustrating a portion of the capacitor body and an external electrode of FIG. 1; and FIG. 4 is a cross-sectional view taken along line I-I' of FIG. 1.

Referring to FIGS. 1 through 4, the capacitor component 100 according to an exemplary embodiment in the present invention includes a body 110, first and second internal electrodes 121 and 122 included therein, first and second conductive layers 131 and 141, first and second insulating layers 132 and 142, first and second band portions 133 and 134, and first to fourth external electrodes 150, 160, 170 and 180, as main constitutions.

In the present exemplary embodiment, the multilayer structure of the first and second conductive layers 131 and 141 and the first and second insulating layers 132 and 142 covering side surfaces of the body 110 may be adopted as described below, such that sealing property, moisture resistance reliability, and the like, may be improved while being advantageous for miniaturization of the capacitor component 100 that may occur at an edge, and the like, of the capacitor component 100.

The body 110 may include a structure in which the plurality of dielectric layers 111 are stacked and the first and second internal electrodes 121 and 122 alternately disposed with respective dielectric layers 111 interposed therebetween.

Here, the body 101 may have a hexahedral shape or a shape similar to the hexahedral shape, and may include first and second surfaces 1 and 2 opposing each other in a Z direction, third and fourth surfaces 3 and 4 connected to the first and second surfaces 1 and 2 and opposing each other in an X direction, and fifth and sixth surfaces 5 and 6 connected to the third and fourth surfaces 3 and 4 and opposing each other in a Y direction.

In addition, the dielectric layer 111 included in the body 110 may include a dielectric material such as ceramic, or the like, known in the art, and may include, for example, $BaTiO_3$ (barium titanate)-based ceramic powder, or the like.

In this case, examples of the $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, in which calcium (Ca), zirconium (Zr), or the like, is partially solid-dissolved in BaTiO₃. However, the BaTiO₃-based ceramic powder is not limited thereto.

In addition, the body 110 may be divided into an active region forming electric capacitance and a cover region disposed on upper and lower parts of the active region.

In detail, referring to FIG. 4, the active region may form capacitance by the first and second internal electrodes 121 and 122, and the cover region may be disposed on upper and lower parts of the active region.

In this case, the cover region may prevent damage to the first and second internal electrodes 121 and 122 due to physical or chemical stress, and may have substantially the same material and constitution as the dielectric layer of the active region except that the first and second internal electrodes 121 and 122 are not included.

Here, the cover region may be obtained together by the green sheet stacking and sintering methods.

The cover region may be implemented by stacking one or two or more green sheets on upper and lower surfaces of the active region and sintering the green sheets.

The first and second internal electrodes 121 and 122 may be alternately disposed to face each other with respective dielectric layers constituting the body 110 interposed therebetween and may be exposed to the third and fourth surfaces 3 and 4 of the body 110, respectively.

Here, the first and second internal electrodes 121 and 122 may be electrically separated from each other by the dielectric layer 111 disposed therebetween.

A material forming the first and second internal electrodes 121 and 122 is not particularly limited, but may be formed by using a conductive paste formed of at least one material of, for example, a precious metal such as palladium (Pd), palladium-silver (Pd—Ag) alloy, or the like, nickel (Ni), and copper (Cu).

A method of printing the conductive paste may include a screen printing method, a gravure printing method, or the like, but is not limited thereto.

The first and second conductive layers 131 and 132 may cover the third and fourth surfaces 3 and 4 of the body 110, respectively, and may be connected to the first and second internal electrodes 121 and 122, respectively.

In this case, the first and second conductive layers 131 and 141 may cover entire third and fourth surfaces 3 and 4 of the body 110, and surfaces of the first and second conductive layers 131 and 141 facing the body 110 may have the same areas as the third and fourth surfaces 3 and 4 of the body 110, respectively, as shown in FIG. 1.

In addition, the first and second conductive layers 131 and 141 may have a uniform thickness based on the third and fourth surfaces 3 and 4 of the body 110.

As one example for obtaining the first and second conductive layers 131 and 141 having this form, a method of transferring the first and second conductive layers 131 and 141 to a surface of the body 110 may be utilized as described below.

According to the related art, a method of applying a conductive paste and sintering the conductive paste when forming the external electrode connected to the internal electrode is used, such that thickness irregularity occurs in a central region and an outer periphery region of the external electrode (thickness of the central region>thickness of the outer periphery region).

In the present exemplary embodiment, by using the first and second conductive layers 131 and 141 having a uniform thickness, electrical characteristics may be uniform, and further, moisture entering from the outside of the capacitor component 100, in particular, moisture resistance reliability in the edge region may be improved.

The first and second insulating layers 132 and 142 may be formed to cover the first and second conductive layers 131 and 141, respectively.

The first and second insulating layers 132 and 142 may be formed of a ceramic material such as barium titanate, or the like, and in this case, the first and second insulating layers 132 and 142 may include the same ceramic material as that included in the body 110, and may also be formed of the same material as the body 110.

Further, as shown in FIG. 3, the first and second insulating layers 132 and 142 may cover the entire first and second conductive layers 131 and 141. In this case, an area of the first and second conductive layers 131 and 141 may be the same as an area of the first and second insulating layers 132 and 142 based on the third and fourth surfaces 3 and 4 of the body 110.

In addition, similar to the first and second conductive layers 131 and 141, the first and second insulating layers 132 and 142 may be formed by a transfer method on the surface of the body 110, and then may be sintered.

Since the first and second insulating layers 132 and 142 before the sintering preferably have a high adhesive force for the transfer, to this end, a relatively large amount of organic material such as binder, or the like, may be included.

In this case, since some organic materials may remain even after sintering, the first and second insulating layers 132 and 142 may include a larger amount of organic material than that of the body 110.

By forming the first and second insulating layers 132 and 142 on an outer periphery of the body 110 as in the present exemplary embodiment, a sealing characteristic of the external electrode may be further improved, thereby minimizing penetration of moisture, a plating liquid, or the like, from the outside.

In this case, since the first and second insulating layers 132 and 142 may be densified rapidly at the time of sintering by the adjacent first and second conductive layers 131 and 141, a structure suitable for improving the moisture resistance property may be effectively obtained.

The first and second insulating layers 132 and 142 may be expected to have an effect of reducing acoustic noise by limiting a height of a solder at the time of mounting the capacitor component on a board.

The first and second band portions 133 and 134 may be spaced apart from each other in the X direction on the second surface 2 of the body 110. The first and second band portions 133 and 134 may be formed of a conductive material.

In addition, the first band portion 133 may be disposed to be connected to the first conductive layer 131, and the second band portion 134 may be disposed to be connected to the second conductive layer 141.

In detail, when an upper end of the first conductive layer 131 is formed in parallel with the second surface 2 of the body 110, and an end of the first band portion 133 is formed to protrude more than the third surface 3 of the body 110, the upper end of the first conductive layer 131 and the end of the first band portion 133 may be in contact with each other and electrically connected to each other.

In addition, when an upper end of the second conductive layer 141 is formed in parallel with the second surface 2 of the body 110, and an end of the second band portion 134 is formed to protrude more than the fourth surface 4 of the body 110, the upper end of the second conductive layer 141 and the end of the second band portion 134 may be in contact with each other and electrically connected to each other.

The first external electrode 150 may be formed at a corner connecting the second, third, fifth, and sixth surfaces 2, 3, 5, and 6 of the body 110.

The first external electrode 150 may be formed to cover the first band portion 133 and to cover a portion of the first conductive layer 131 and the first insulating layer 132.

In addition, the first external electrode 150 may be electrically connected to the first internal electrode 121.

In detail, the first external electrode 150 may cover a portion of the first insulating layer 132 and may be connected to the first conductive layer 131 to be electrically connected to the first internal electrode 121.

Here, the first external electrode 150 may be a plating layer and may have a multilayer structure.

For example, the first external electrode 150 may include first through third layers 151 to 153.

Here, the first layer 151 may be formed as a copper layer obtained by plating copper. Here, the copper layer may be formed by plating using the first band portion 133 as a seed.

The second layer 152 may be formed as a nickel layer obtained by plating nickel in a form covering the first layer 151, and the third layer 153 may be formed as a tin layer obtained by plating tin in a form covering the second layer 152.

Meanwhile, by performing silver (Ag) plating on the first layer, which is the copper layer, instead of forming the second and third layers, the first external electrode may be formed as a double layer including a copper layer and a silver (Ag) layer.

The second external electrode 160 may be formed at a corner connecting the second, fourth, fifth, and sixth surfaces 2, 4, 5, and 6 of the body 110.

The second external electrode 160 may be formed to cover the second band portion 134 and to cover a portion of the second conductive layer 141 and the second insulating layer 142, and may be disposed to be spaced apart from the first external electrode 150 on the second surface 2 of the body 110.

In addition, the second external electrode 160 may be electrically connected to the second internal electrode 122.

In detail, the second external electrode 160 may cover a portion of the second insulating layer 142 and may be connected to the second conductive layer 141 to be electrically connected to the second internal electrode 122.

Here, the second external electrode 160 may be a plating layer and may have a multilayer structure.

For example, the second external electrode 160 may include first through third layers 161 to 163.

Here, the first layer 161 may be formed as a copper layer obtained by plating copper. Here, the copper layer may be formed by plating using the second band portion 134 as a seed.

The second layer 162 may be formed as a nickel layer obtained by plating nickel in a form covering the first layer 161, and the third layer 163 may be formed as a tin layer obtained by plating tin in a form covering the second layer 162.

Meanwhile, by performing silver plating on the first layer, which is the copper layer, instead of forming the second and third layers, the second external electrode may be formed as a double layer including a copper layer and a silver layer.

The third external electrode 170 may be formed at a corner connecting the first, third, fifth, and sixth surfaces 1, 3, 5, and 6 of the body 110.

The third external electrode 170 may be formed to cover a portion of the first conductive layer 131 and the first insulating layer 132 and a portion of the first surface 1 of the body 110.

In addition, the third external electrode 170 may be electrically connected to the first internal electrode 121.

In detail, the third external electrode 170 may cover a portion of the first insulating layer 132 and may be connected to the first conductive layer 131 to be electrically connected to the first internal electrode 121.

Here, the third external electrode 170 may have a multilayer structure.

For example, the third external electrode 170 may include first through third layers 171 to 173.

Here, the first layer 171 may be formed as a sintered electrode obtained by sintering a conductive paste, wherein the conductive paste may be copper.

The second layer 172 may be formed as a nickel layer obtained by plating nickel in a form covering the first layer 171, and the third layer 173 may be formed as a tin layer obtained by plating tin in a form covering the second layer 172.

The fourth external electrode 180 may be formed at a corner connecting the first, fourth, fifth, and sixth surfaces 1, 4, 5, and 6 of the body 110.

The fourth external electrode 180 may be formed to cover a portion of the second conductive layer 141 and the second insulating layer 142 and a portion of the first surface 1 of the body 110, and may be disposed to be spaced apart from the third external electrode 170 on the first surface 1 of the body 110.

In addition, the fourth external electrode 180 may be electrically connected to the second internal electrode 122.

In detail, the fourth external electrode 180 may cover a portion of the second insulating layer 142 and may be connected to the second conductive layer 141 to be electrically connected to the second internal electrode 122.

Here, the fourth external electrode 180 may have a multilayer structure.

For example, the fourth external electrode 180 may include first through third layers 181 to 183.

Here, the first layer 181 may be formed as a sintered electrode obtained by sintering a conductive paste, wherein the conductive paste may be copper.

The second layer 182 may be formed as a nickel layer obtained by plating nickel in a form covering the first layer 181, and the third layer 183 may be formed as a tin layer obtained by plating tin in a form covering the second layer 182.

Figure 5:
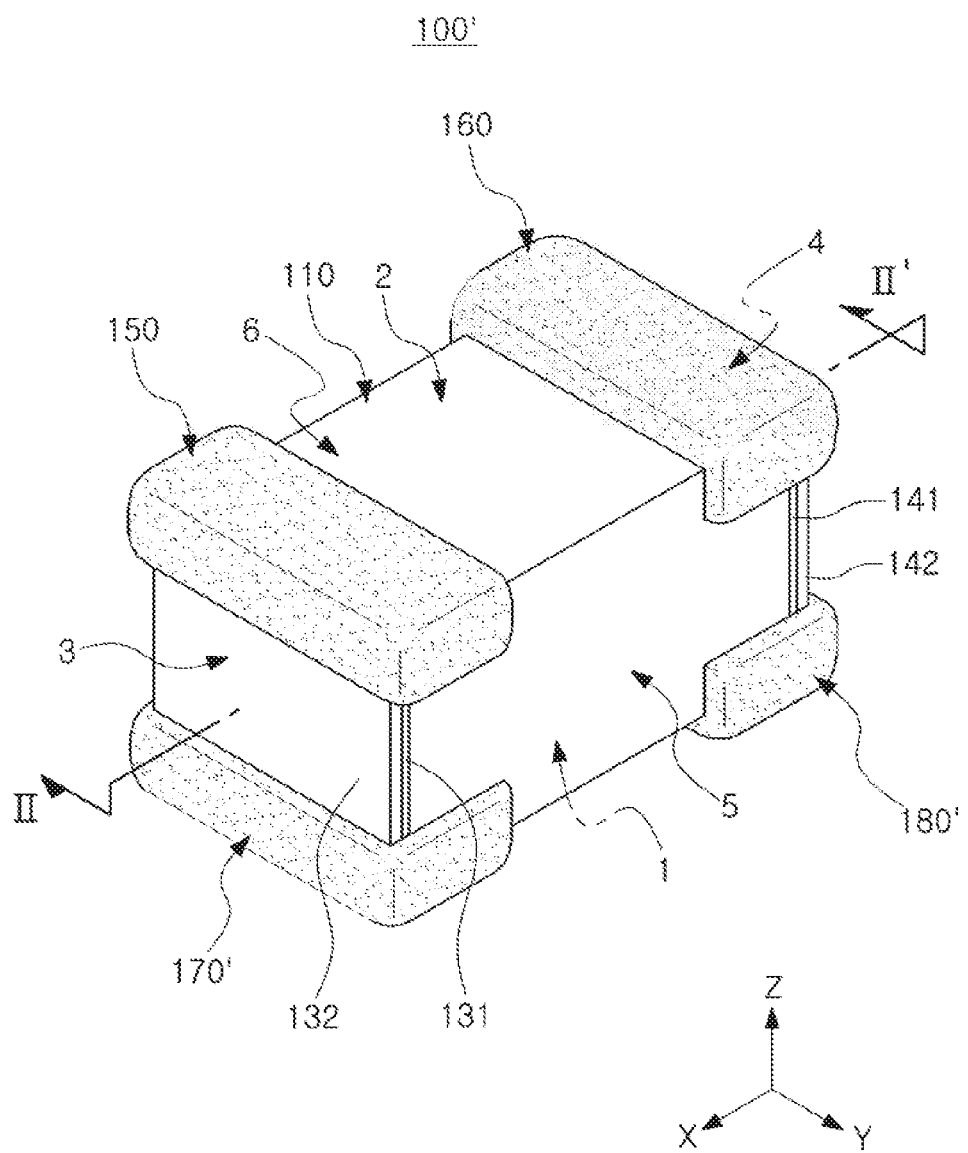
FIG. 5 is a schematic perspective view illustrating a capacitor component according to another exemplary embodiment in the present disclosure.
Figure 6:
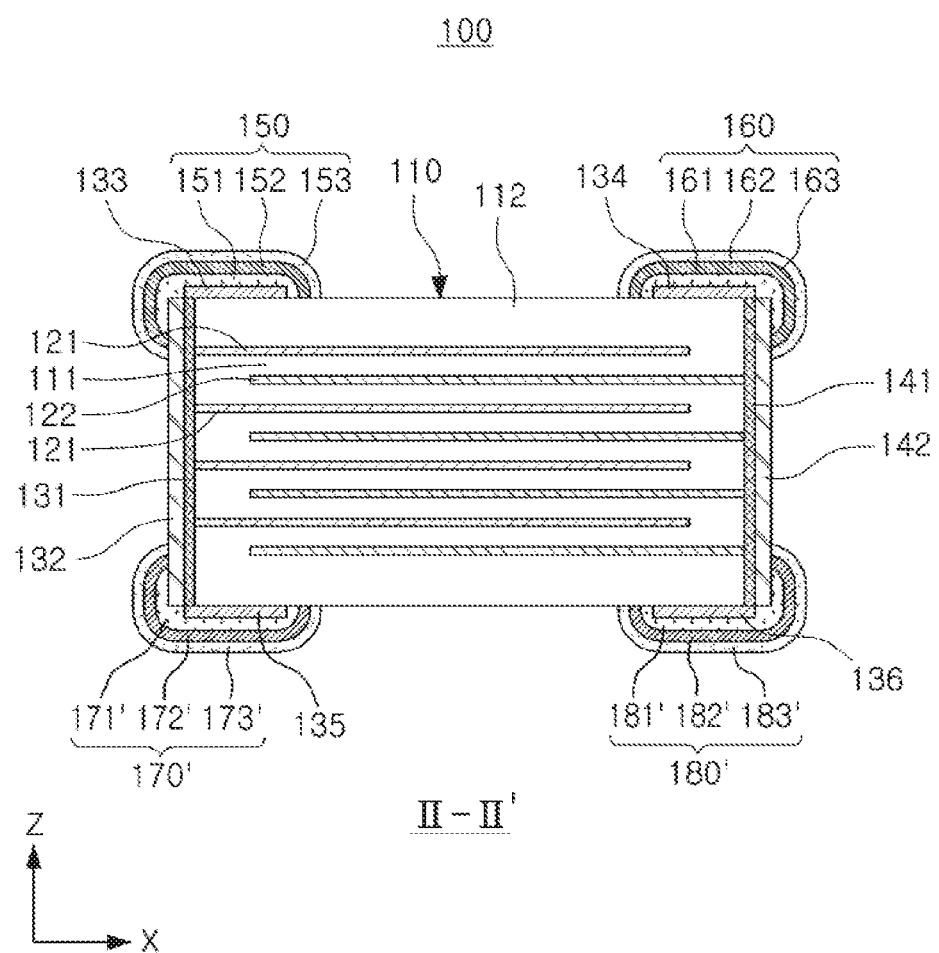
FIG. 6 is a cross-sectional view taken along II-II' of FIG. 5.

FIG. 5 is a schematic perspective view illustrating a capacitor component according to another exemplary embodiment in the present disclosure, and FIG. 6 is a cross-sectional view taken along II-II' of FIG. 5.

Here, since structures of the body 110, the first and second internal electrodes 121 and 122, the first and second conductive layers 131 and 141, the first and second insulating layers 132 and 142, and the first and second external electrodes 150 and 160 are similar to those of exemplary embodiments as described above, a detailed description thereof is omitted to avoid overlapping portions, and the third and fourth band portions and the third and fourth external electrodes having structures different from those of the above-described exemplary embodiment are shown and described in detail based on this.

Referring to FIGS. 5 and 6, a multilayer electronic component 100' of the present exemplary embodiment may further include third and fourth band portions 135 and 136.

The third and fourth band portions 135 and 136 may be spaced apart from each other in the X direction on the first surface 1 of the body 110.

In addition, the third band portion 135 may be disposed to be connected to the first conductive layer 131, and the fourth band portion 136 may be disposed to be connected to the second conductive layer 141.

In detail, when a lower end of the first conductive layer 131 is formed in parallel with the first surface 1 of the body 110, and an end of the third band portion 135 is formed to protrude more than the third surface 3 of the body 110, the lower end of the first conductive layer 131 and the end of the third band portion 133 may be in contact with each other and electrically connected to each other.

In addition, in the case of the fourth band portion 136, when a lower end of the second conductive layer 141 is formed in parallel with the first surface 1 of the body 110, and an end of the fourth band portion 136 is formed to protrude more than the fourth surface 4 of the body 110, the lower end of the second conductive layer 141 and the end of the fourth band portion 136 may be in contact with each other and electrically connected to each other.

Further, the third external electrode of the present exemplary embodiment may be formed to cover the third band portion, and the fourth external electrode may be formed to cover the fourth band portion.

Here, all of the third external electrode 170 may be a plating layer without including a sintered electrode, and may have a multilayer structure.

For example, the third external electrode 170 may include first through third layers 171 to 173.

Here, the first layer 171 may be formed as a copper layer obtained by plating copper. Here, the copper layer may be formed by plating using the third band portion 135 as a seed.

The second layer 172' may be formed as a nickel layer obtained by plating nickel in a form covering the first layer 171', and the third layer 173' may be formed as a tin layer obtained by plating tin in a form covering the second layer 172'.

In addition, all of the fourth external electrode 180' may be a plating layer without including a sintered electrode, and may have a multilayer structure.

For example, the fourth external electrode 180 may include first through third layers 181 to 183.

Here, the first layer 181 may be formed as a copper layer obtained by plating copper. Here, the copper layer may be formed by plating using the fourth band portion 136 as a seed.

The second layer 182' may be formed as a nickel layer obtained by plating nickel in a form covering the first layer 181', and the third layer 183' may be formed as a tin layer obtained by plating tin in a form covering the second layer 182'.

Hereinafter, an example of a method of manufacturing a capacitor component having the above-described structure is described. The description of the manufacturing method will provide a clearer understanding of the structure of the capacitor component.

In the method of manufacturing a capacitor component, first, a body may be formed by alternately stacking a plurality of dielectric layers and first and second internal electrodes.

Here, the body may be formed by alternately stacking the plurality of dielectric layers and the first and second internal electrodes. For example, a method of applying a ceramic green sheet and a conductive paste for an internal electrode and stacking the dielectric layers and the internal electrodes may be used.

Next, the first and second band portions may be formed on the second surface of the body to be spaced apart from each other.

The first and second band portions may be formed on the body by one method among stacking, printing, and deposition.

Figure 7:
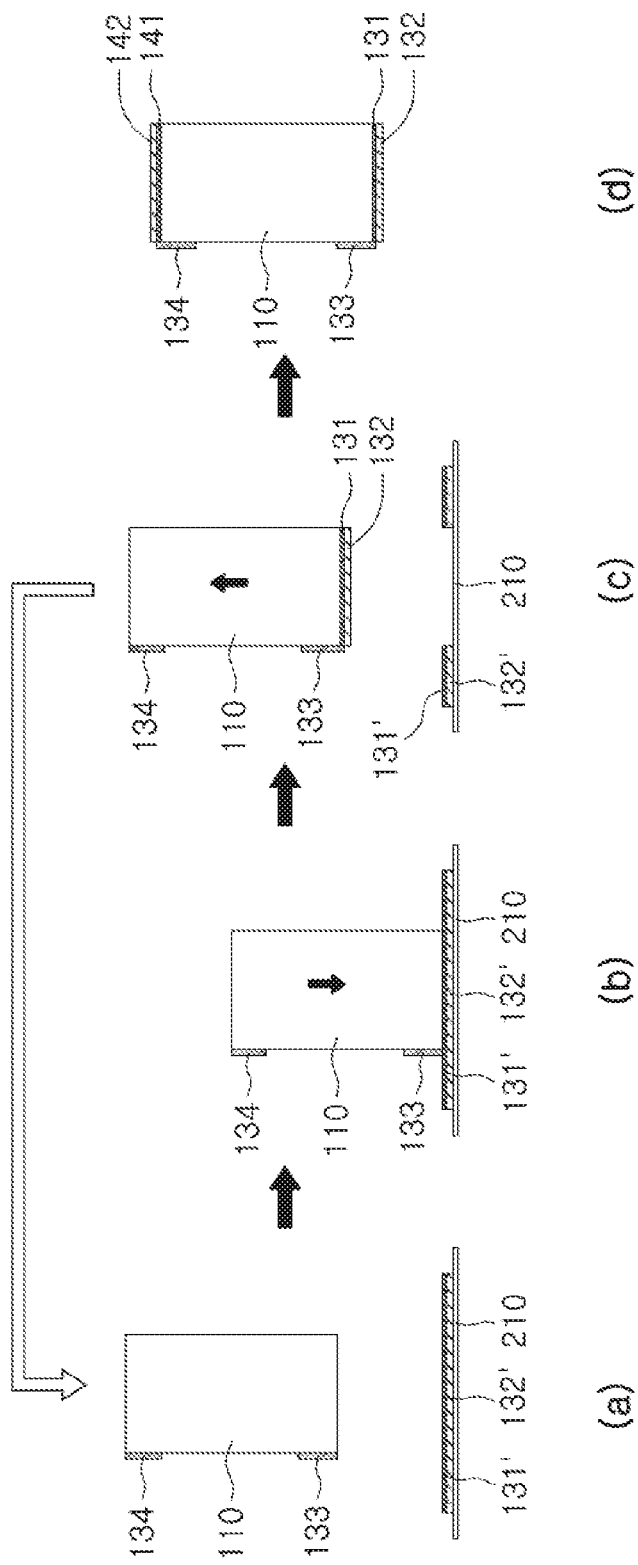
FIG. 7 is a view schematically illustrating a method of forming first and second connection portions in the capacitor body in an exemplary embodiment in the present disclosure.

Next, as shown in FIG. 7, the first and second conductive layers 131 and 141 and the first and second insulating layers 132 and 142 covering the first and second conductive layers 131 and 141, respectively, may be transferred on the surface of the body 110.

The first and second conductive layers 131 and 141 may be formed on a surface of the body 110 to which the first and second internal electrodes are exposed.

For example, in the transfer method of the first and second conductive layers 131 and 141, an insulating layer 132' having a sheet form on a support 210 and a conductive layer 131' on the insulating layer 132' may be stacked, one surface of the body 110 may be pressed on the laminate, such that a portion of the conductive layer 131' and a portion of the insulating layer 132' may be simultaneously attached to one surface of the body 110. Thus, the first conductive layer 131 and the first insulating layer 132 may be formed by a single transfer method. The conductive layer and the insulating layer transferred on the body 110 are in a state before sintering, and may include components such as a binder, an organic solvent, and the like.

As described above, an example of the method of forming the first conductive layer 131 and the first insulating layer 132 on the body 110 is described, and the second conductive layer 141 and the second insulating layer 142 may be formed by applying the same method to the opposite side of the body 110.

Next, the external electrodes may be formed.

The first external electrode may be formed to cover a portion of the first band portion and the first insulating layer, and the second external electrode may be formed to cover a portion of the second band portion and the second insulating layer and may be formed to be spaced apart from the first external electrode. The first and second external electrodes may be formed by plating using the first and second band portions as seeds.

The third external electrode may be formed to cover a portion of the first insulating layer and a portion of a lower surface of the body, and the fourth external electrode may be formed to cover a portion of the second insulating layer and a portion of the lower surface of the body and to be spaced apart from the third external electrode. The third and fourth external electrodes may be formed by forming a first layer first and further forming a plating layer thereon.

Here, the first layer may be formed by dipping the body into the conductive paste, or the like. Then, the body, the conductive layer, the insulating layer, and the first layer may be sintered, and these layers may be simultaneously sintered.

Meanwhile, the method may further include forming third and fourth band portions to be spaced apart from each other on a surface of the body opposing a surface on which the first and second band portions are formed, before forming the external electrodes.

The third external electrode may be formed to cover the third band portion, and the fourth external electrode may be formed to cover the fourth band portion. Here, the first and second external electrodes may be formed without a sintered electrode by plating using the third and fourth band portions as seeds.

As set forth above, according to exemplary embodiments in the present disclosure, the hermetic sealing may be enhanced, the acoustic noise may be reduced, the component mounting density at the time of mounting the capacitor component to a set may be increased by forming the external electrode so as to easily form the connection between the connection portion and the band of the external electrode formed on the surface on which the internal electrode of the body is exposed without additional dipping and additional operation for connecting the band portion to the connection portion after aligning the capacitor.

While the present invention has been shown and described in connection with the embodiments, it will be apparent to those skilled in the art that modifications and variations can be made without departing from the spirit and scope of the invention as defined by the appended claims.

What is claimed is:

1. A capacitor component comprising:
   a body including:
      first and second surfaces opposing each other and third and fourth surfaces connected to the first and second surfaces and opposing each other, and
      a structure in which a plurality of dielectric layers are stacked and first and second internal electrodes alternately disposed with respective dielectric layers interposed therebetween to be exposed to the third and fourth surfaces respectively;
   first and second conductive layers covering the third and fourth surfaces respectively and connected to the first and second internal electrodes respectively;
   first and second insulating layers, covering the first and second conductive layers respectively;
   first and second band portions spaced apart from each other on the second surface;
   a first external electrode covering a portion of the first band portion and a portion of the first insulating layer on the third surface;
   a second external electrode covering a portion of the second band portion and a portion of the second insulating layer on the fourth surface;
   a third external electrode covering another portion of the first insulating layer on the third surface and a portion of the first surface, the third external electrode being separate and spaced apart from the first external electrode; and
   a fourth external electrode covering another portion of the second insulating layer on the fourth surface and another portion of the first surface, the fourth external electrode being separate and spaced apart from the second external electrode.

2. The capacitor component of claim 1, wherein the first and second external electrodes are plating layers.

3. The capacitor component of claim 2, wherein the plating layer includes a copper layer, a nickel layer formed on the copper layer, and a tin layer formed on the nickel layer.

4. The capacitor component of claim 1, wherein the first and second band portions are disposed to be connected to the first and second conductive layers respectively.

5. The capacitor component of claim 1, further comprising:
   third and fourth band portions spaced apart from each other on the first surface,
   wherein the third external electrode covers the third band portion, and
   the fourth external electrode covers the fourth band portion.

6. The capacitor component of claim 5, wherein the third and fourth band portions are disposed to be connected to the first and second conductive layers respectively.

7. The capacitor component of claim 5, wherein the first to fourth external electrodes are plating layers.

8. The capacitor component of claim 1, wherein an end of the first external electrode on the third surface is spaced apart from an end of the third external electrode on the third surface, and an end of the second external electrode on the fourth surface is spaced apart from an end of the fourth external electrode on the third surface.

9. A method of manufacturing a capacitor component comprising:
   forming a body by alternately stacking a plurality of dielectric layers and first and second internal electrodes;
   forming first and second band portions on an upper surface of the body to be spaced apart from each other;
   forming first and second conductive layers and first and second insulating layers covering the first and second conductive layers, respectively, on opposing first and second surfaces of the body to which the first and second internal electrodes are exposed, respectively, and
   forming a first external electrode covering a portion of the first band portion and a portion of the first insulating layer on the first surface of the body, forming a second external electrode covering a portion of the second band portion and a portion of the second insulating layer on the second surface of the body, forming a third external electrode covering another portion of the first insulating layer on the first surface of the body and a portion of a lower surface of the body, wherein the third external electrode is separate and spaced apart from the first external electrode, and forming a fourth external electrode to cover another portion of the second insulating layer on the second surface of the body and another portion of the lower surface of the body, wherein the fourth external electrode is separate and spaced apart from the second and third external electrodes.

10. The method of claim 9, wherein in the forming of the first and second band portions comprises a method selected from a group consisting of stacking, printing, and deposition.

11. The method of claim 9, wherein the first and second conductive layers are foil led by a green transfer method.

12. The method of claim 9, wherein in the forming of the first and second conductive layers and the first and second insulating layers, a laminate of the first and second conductive layers and the first and second insulating layers is transferred to the body in a single operation.

13. The method of claim 9, wherein the first and second external electrodes are formed by plating using the first and second band portions as seeds.

14. The method of claim 9, further comprising, before the forming of the external electrodes, forming third and fourth band portions to be spaced apart from each other on a surface of the body opposing a surface on which the first and second band portions are formed.

15. The method of claim 14, wherein the third external electrode is formed to cover the third band portion, and the fourth external electrode is formed to cover the fourth band portion.

16. The method of claim 15, wherein the third and fourth external electrodes are formed by plating using the third and fourth band portions as seeds.

\* \* \* \* \*